(12) United States Patent
Uppuluri et al.

(10) Patent No.: US 7,872,160 B2
(45) Date of Patent: Jan. 18, 2011

(54) SINGLE POT PROCESS FOR THE REGIOSELECTIVE SYNTHESIS OF NEOLIGNAN FRAMEWORK ASARONES

(75) Inventors: Venkata Mallavadhani Uppuluri, Orissa (IN); Venkata Subrahmanya Sudhakar Akella, Orissa (IN); Anita Mahapatra, Orissa (IN)

(73) Assignee: Council of Scientific & Industrial Research, New Delhi, IN (US)

( * ) Notice: Subject to any disclaimer, the term of this patent is extended or adjusted under 35 U.S.C. 154(b) by 144 days.

(21) Appl. No.: 12/290,580

(22) Filed: Oct. 31, 2008

(65) Prior Publication Data
US 2010/0099856 A1 Apr. 22, 2010

(30) Foreign Application Priority Data
Mar. 31, 2008 (IN) .......................... 848/DEL/2008

(51) Int. Cl.
*C07C 41/06* (2006.01)

(52) U.S. Cl. ..................................................... 568/644
(58) Field of Classification Search ........................ None
See application file for complete search history.

(56) References Cited

U.S. PATENT DOCUMENTS 6,544,390 B2 * 4/2003 Sinha et al. ............ 204/157.93
6,969,778 B2 * 11/2005 Sinha et al. ................. 568/646

* cited by examiner

*Primary Examiner*—Rosalynd Keys
(74) *Attorney, Agent, or Firm*—Abelman, Frayne & Schwab

(57) ABSTRACT

The present invention provides a single pot process for the regioselective synthesis of neolignan framework [3(R)-Ethyl-2(S)-methyl-3-(2",4",5"-trimethoxyphenyl)-1-(2',4',5'-trimethoxyphenyl)propane from toxic β-isomer rich asarone using montmorillonite acidic clay by employing microwave organic reaction enhancement (MORE) chemistry. This may be useful as versatile synthetic protocol for the synthesis of a large number of lignan and neolignan frameworks.

7 Claims, No Drawings

SINGLE POT PROCESS FOR THE REGIOSELECTIVE SYNTHESIS OF NEOLIGNAN FRAMEWORK ASARONES

FIELD OF THE INVENTION

The present invention relates to a single pot process for the regioselective synthesis of a neolignan framework from asarones. Particularly the present invention relates to a single pot regioselective synthesis of a neolignan framework from asarones by using Montmorillonite clay under microwave Irradiation.

The present invention is a single pot regioselective synthesis of neolignan framework [3(R)-Ethyl-2(S)-methyl-3-(2",4",5"-trimethoxyphenyl)-1-(2',4',5'-trimethoxyphenyl)propane of Formula 3] from toxic β-isomer rich asarone (Formula-1) using montmorillonite acidic clay by employing microwave organic reaction enhancement (MORE) chemistry. This may further be useful as versatile synthetic protocol for the synthesis of a large number of lignan and neolignan frameworks.

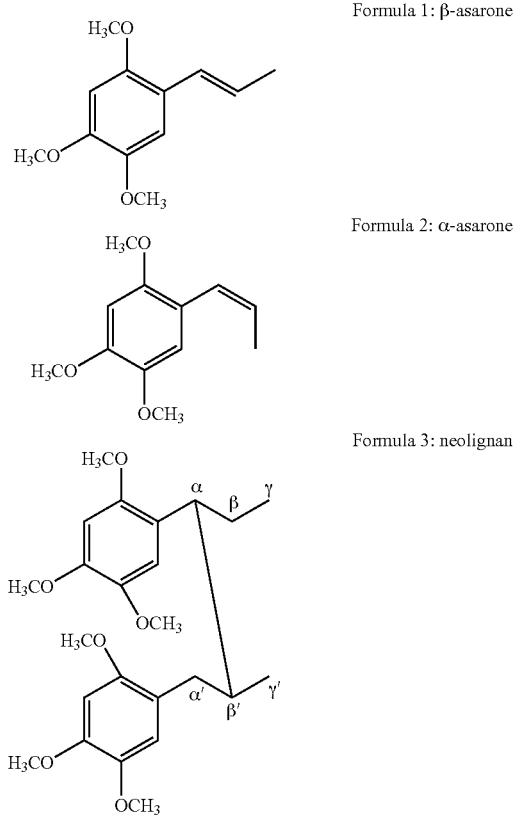

BACKGROUND OF THE INVENTION

The present invention is extremely useful for the synthesis of novel neolignan frameworks in large quantities to have a scope for a wide range of biological activities including anti-cancer, anti-HIV, anti-inflammatory, antifungal, antioxidant and neuroleptic, which are reported for structurally similar neolignan frameworks. Lignans and neolignans are a large group of natural products characterized by the coupling of two $C_6$-$C_3$ units which are derived from cinnamic acid derivatives but present in small quantities in plants. The $C_6$-$C_3$ unit corresponding to a phenyl propane is numbered from 1 to 6 in benzene ring and α, β, γ in the propyl chain. For the second $C_6$-$C_3$ unit, the numbers are primed. If the linkage between two $C_6$-$C_3$ units, is through β-β' then the compound is termed as lignan. If the linkage through any other positions, the compounds referred as neolighans (C. B. S. Rao, Chemistry of Lignans, Andhra University Press, Visakhapatanam, India, 1978, Ch-I, 1).

The aryl moieties of the lignans are substituted mostly with the hydroxyl (phenolic) or their corresponding methyl ethers and methylenedioxy function-alities (S. Jensen, J. Hansen and P. M. Boll, Phytochem., 1993, 33(3), 523). The oxidation of phenols could give rise to phenoxy radicals followed by coupling with a second phenoxyl radical forming lignans and neolignans (S. Fujisawa, T. Atsumi, Y. Murakami and Y. Kadoma, Arch. Immunol. Ther. Exp., 2005, 53, 28). The coupling can take place in three ways such as i) C—C(aryl-aryl): forming biphenyl type lignans, ii) C—C(aryl-propyl chain): forming phenyl propane cross coupling products, iii) C—O(aryl or propyl-phenoxy radicals): forming phenyl propane dimeric ethers. The third category of coupling products are named as oxy-neolignans. These oxy-neolignans are present both in chain and cyclic forms (G. P. Moss, Pure Appl. Chem., 2000, 72(8), 1493). The oxidation of phenols often yields phenoxy radicals which couple with little selectivity. The new C—C and C—O bonds are formed mainly in ortho- and para-positions to the phenolic hydroxyls (D. A. Whitig, Comprehensive Organic Synthesis, B. M. Trost, I. Fleming and G. Pattenden, Eds., Pergamon, Oxford, 1991, 3, 659). Synthetically useful reactions are obtained only when the reactive sites are blocked by substituents, for example from 2,6 and 2,4 substituted phenols, C—C bonded biphenyls can be obtained in good yields.

But the more interesting neolignans are derived from the propyl chain cross coupling products such as α-α', α-β', α-γ', β-α', β-γ', γ-γ', γ-α', γ-β'. These skeletons are highly interesting and rare in nature. These frameworks are expected to exhibit highly significant and potent biological activities as the basic oxygenated aryl rings are retained with the formation of new C—C bonds in the propenyl chains. The propenyl chains can be activated by both ionic and radical mechanisms. Once the double bond is opened up the resulting ions/radicals will undergo cross coupling reactions to form new C—C bonds. The activation of double bonds can be achieved conventionally by thermal or photochemical means. Generally, activation of these double bonds are achieved in presence of acid catalysts such as mineral acids, lewis acids or organic acids. But these reactions are not only slow and low yielding but also non-regio and stereoselective.

The acidic montmorilonite clays found highly suitable for carbocationic reactions such as condensations, cycloadditions, rearrangements and redox reactions (P. Laszlo, Science, 1987, 235, 1473). Montmorillonite K10 catalyst reported to yield densely functionalized isomerized Baylies-Hillman products with a new C—C bond formation under solvent free conditions (P. Shanmugam and P. Rajasingh, Tetrahedron, 2004, 60, 9283). These clay catalysts have an added advantage as they are eco-friendly and play an important role in organic synthesis and manufacture of industrial products and serves as model reagents in Green Chemistry.

Microwave Organic Reaction Enhancement (MORE) Chemistry has been shown to affect several organic transformations such as cyclizations, alkyne functionalizations, condensations and rearrangements. These reactions were accelerated with very high yields under microwave irradiated conditions with and without solvent (S. Caddick, Tetrahedron, 1995, 51(38), 10403). The double bond activation of isoeugenol (allyl) to eugenol (cinnamyl) was affected under MORE conditions with almost quantitative yield (A. Loupy, A. Petit, J. Hamelin, F. T. Boullet, P. Jacquault and D. Mathe, Synthesis, 1998, 1213).

Although the plant derived products have found widespread applications in the field of pharmaceuticals, cosmetics, dyes and essential oils etc. as they are easily available, cheaper and safer than synthetic products, it is not always true. There are several phytochemicals which beyond a certain limit, diminishes the market potential of products such as phenyl propenes (E. C. miller, A. B. Swanson, D. H. Philips, T. L. Fletcher, A. Liem and J. A. Miller, Cancer research, 1983, 43(3), 1124; S. C. Kim, A. Liem, B. C. Stewart and J. A. Miller, Carcino-genesis, 1999, 20(7), 1303). The trans isomer (α-asarone) is found safer than the cis-(β-asarone) or allyl-(saffrole) isomers which are toxic and highly carcinogenic (J. B. Harborne and H. Baxter, Phytochemical Dictionary: A handbook of Bioactive compounds from plants, Taylor & Francis Ltd, Washington D.C., 1993, 474).

Some varieties of *Acorus* contain very high percentage of cis-phenyl propene (β-asarone, 70-90%) while some other contain very less (3-8%) (E. stahl and K. Keller, Planta Medica, 1981, 43, 128; G. Waltraud and O, Schimmer, Mutation research, 1983, 121, 191; G. Mazza, J. Chromatography, 1985, 328, 179; T. J. Motley, Economic Botany, 1994, 48, 397).

β-asarone is reported to be carcinogenic in animals and has been found to induce tumors in duodenal region after oral administration. It has also shown chromosome damaging effect on human lymphocytes in vitro after metabolic activation (J. M. Taylor, W. I. Jones, E. C. Hogan, M. A. Gross, D. A. David and E. L. Cook, Toxicol. Appl. Pharmacol, 1967, 10, 405; K. Keller, K. P. Odenthal and P. E. Leng, Planta Medica, 1985, 1, 6; G. Abel, Planta medica, 1987, 53(3), 251; M. Riaz, Q. Shadab, F. M. Chaudhary, Hamdard Medicus, 1995, 38(2), 50). As a result, the *A. Calamus* of Asia is Internationally banned for its use in pharmaceutical, perfumery and flavor industries.

Neolignans and lignans are known for their wide range of biological activities including anticancer, anti-HIV, hepatoprotective, antifungal, anti-bacterial, anti oxidant and plant growth regularity activities (J. Harmatha and L. Dinan, Phytochemistry, 2003, 2, 321).

Reference may be made to Mori et al. (K. Mori, M. Komatsu, M. Kido and K. Nakagawa, Tetrahedron, 1986, 42(2), 523) wherein peracetic acid has been used to oxidize the propenyl unit of anethole and a-asarone. The drawbacks are the products obtained mainly by coupling at β-β' linkage forming diaryl terahydrofuran moieties with very low yields.

Reference may be made to Anjaneyulu et al. (A. S. R. Anjaneyulu and D. S. Kumar, Indian J. Chem., 1996, 35B, 1038) wherein phenolic oxidative coupling of phenyl propenoids was affected with phosphomolybdic acid impregnated silica gel. The drawbacks are the products formed by aryl-aryl dimerisation with no side chain cross coupling.

Reference may be made to Syrjanen et al. (K. Syrjanen and G. Brunow, Tetrahedron, 2001, 57, 365) wherein coniferyl alcohol and aposinol have been subjected to phenolic oxidation with Horseradish peroxidase. The drawbacks are the products formed mostly by the dimerisation reactions without affecting the cross coupling reactions.

Reference may be made to Cathala et al. (B. Cathala, V. A. Beghin and R. Douillard, C. R. Biologies, 2004, 327, 777) wherein coniferyl alcohol was subjected to coupling reactions in presence of peroxidase. The drawbacks are the products obtained by β-β and β-O-4 couplings.

Reference may be made to Sinha et al. (A. K. Sinha, R. Acharya and B. P. Joshi, J. Nat. Prod., 2002, 65(5), 764) wherein β-asarone is subjected to oxidation with DDQ. The drawbacks are the formation of tran-2,4,5-trimethoxy cinnamaldehyde by oxidation of the double bonded methyl with no traces of cross coupling products.

Reference may be made to Sinha et al. (A. K. Sinha, R. Acharya and B. P. Joshi, US Patent No: WO03082786, 2003) wherein β-asarone or α-asarone rich *A. calamus* is oxidized with DDQ with or without solid support of silica gel or alumina in dry organic solvent. The drawbacks are isomerisation and oxidation of the propenyl unit was observed instead of cross coupling product formation.

Reference may be made to Adams et al. (J. M. Adams, S. E. Davies, S. H. Graham and J. M. Thomas, J. Catalysis, 1982, 78, 197) wherein the dimerisation of anithole [1-(4-metoxybenzene)-prop-1-en] has been affected with di- and tri-valent cation exchanged montmorillonites. The drawbacks are nonregioselectivity with low yields.

Reference may be made to Malhotra et al. (S. Malhotra and S. K. Koul, Phytochemistry, 1990, 29, 2733) wherein the dimerisation of 2,4,5-trimethoxyphenyl propene was carried out by sunlight irradiation. The drawbacks are the product formed is doubly cross coupled at α-α' and β-β' with very low yield (7%) and longer reaction time (40 hr.).

Reference may be made to Sinha et al. (A. K. Sinha, B. P. Joshi, R. Acharya, US Patent Application No: 20040049085, 2004) wherein the dimerisation of 2,4,5-trimethoxyphenyl propene was carried out and the corresponding neolignan dimer with a saturated alkyl chain was obtained in 3 steps. The drawbacks are use of toxic reagents like palladium and DDQ, inert atmosphere and pressure reactors. Further this method is multistep, time consuming and low yielding.

On the contrary, the present invention has been achieved under complete Green Chemistry conditions using a novel combination of montmorillonite acid clay catalyst and microwave irradiation and discloses single pot regioselective dimerisation of 2,4,5-trimethoxyphenyl propene (inseparable mixture of α- and β-asarones obtained as the major metabolite of *Acorus calamus* plant) of the formula 1 & 2 to form a novel neolignan viz: 3(R)-ethyl-2(S)-methyl-3-(2",4",5"-trimethoxy-phenyl)-1-(2',4',5'-trimethoxyphenyl)propane.

OBJECTIVES OF THE INVENTION

The main objective of the present invention is to provide a single pot process for the regioselective synthesis of neolignan frameworks from asarones with montmorillonite acid clay using microwave organic reaction enhancement (MORE) chemistry.

Another object of the present invention is to utilize the toxic β-isomer rich asarone for value addition.

Yet another object of the present invention is to provide a rapid microwave irradiated method to synthesize neolignans from non-phenolic compounds.

Yet another object of the present invention is to use a non-corrosive, non-toxic and eco-friendly clay catalyst to synthesise neolignan frameworks under complete Green chemistry conditions.

Yet another object of the present invention is to optimize the solvents and irradiation time.

Yet another object of the present invention is to provide an economical and easy purification process to obtain highly pure neolignan moiety for bio-evaluation.

SUMMARY OF THE INVENTION

Accordingly the present invention provides a single pot process for the regioselective synthesis of neolignan framework from asarones which comprises mixing β asarone with montmorillonite clay in a ratio of 1.0:0.1 to 1.0:0.5 (w/w) in hydrocarbon solvent and subjecting the above said solution mixture to microwave irradiation, for a period of 5-20 min, removing the catalyst by filtration and evaporating the solvent from filtrate by evaporation under reduced pressure to obtain the residue, subjecting the above said residue to combiflash chromatography and eluting it with a mixture of n-hexane and ethyl acetate to obtain the desired product.

In an embodiment of the present invention the ratio of β asarone with montmorillonite clay used is preferably in the range of in the 1.0:0.1 to 1.0:0.2 (w/w).

In yet another embodiment the hydrocarbon solvent used is xylene.

In yet another embodiment the reaction time period used for microwave irradiation is preferably in the range of 5-15 minutes.

In yet another embodiment the product neolignan obtained is in the form of colorless viscous oil.

In still another embodiment the yield of neolignan obtained is in the range of 70-75%.

In still another embodiment the purity of neolignan obtained is in the range of 97-98%.

DETAILED DESCRIPTION OF THE INVENTION

The present invention provides a novel process for the synthesis of neolignans under Green Chemistry conditions using acidic montmorillonite clay and microwave irradiation from toxic β-isomer rich asarone. It is noteworthy to mention that the above process not only led to novel neolignan [3(R)-ethyl-2(S)-methyl-3-(2",4",5"-trimethoxyphenyl)-1-(2',4', 5'-trimethoxyphenyl)propane] but also provided the New Chemical Entity (NCE) for value addition and detailed bio-evaluation. Further the synthesis was achieved using eco-friendly and re-usable acidic montmorillonite clay catalyst. Literature search reveals that neolignans were found to exhibit a wide range of pharmacological activities such as anticancer, anti-HIV, antiinflammatory, antifungal, antioxidant and neuroleptic etc. In view of this and their low natural accumulation, several synthetic protocols have been tried but most of the methods involve multisteps using hazardous and corrosive chemicals with low overall yields.

To the best of our knowledge, there are very few reports in which toxic β-asarone of *Acorus* is utilized for its value addition. Hence, it has been subjected to chemical modification using a single pot regioselective novel synthetic protocol. The propenyl moiety of the β-asarone was activated with acidic montmorillonite clay under microwave irradiation conditions to effect cross coupling reactions to yield a novel neolignan framework in excellent yield (70%) with 97.2% HPLC purity. This is a classical example of Green Chemistry and the product has the desired structural features to exhibit potent biological activities and forming a series of biologically active neolignan derivatives. In the present invention, we have succeeded in the synthesis of a novel neolignan from β-isomer rich asarone by a simple, rapid and economical process. The formation of the neolignan is the first example of microwave assisted, montmorillonite acid clay catalysed one step synthesis of dimer from phenyl propene derivatives which, in fact would offer the advantages of simplicity and can be applied for large scale preparations.

The present invention provides a novel single pot regioselective synthesis of a neolignan framework from asarones with montmorillonite clay using microwave irradiation, which comprises carbocationic based dimerisation of β-isomer rich asarone to yield a new neolignan using montmorillonite acid clay under microwave irradiation for 15 minutes using xylene as a solvent. A rapid and simple process is available to prepare neolignan from 2,4,5-trimethoxyphenyl propene, which is isolated from the n-hexane extract of the rhizomes of *Acorus calamus*.

The present invention provides a simple and novel process, which involves the conversion of an inseparable mixture of isomeric phenyl propenes directly in to a neolignan. The present invention provides neolignan having two asymmetric centers in sufficient quantity via a simple and economical route, which further provides the opportunity for the evaluation of its wide range of biological activities known for structurally similar neolignans. The present invention provides neolignan, which is capable of undergoing conversion into several naturally occurring neolignan and lignan derivatives.

A mixture of β-isomer rich asarone (2.0 gm), and acidic montmorillonite clay (0.2 gm) in xylene (20 ml) was irradiated in a domestic microwave oven (BPL SANYO BMC 900T. After 5 mins. of irradiation change of colour of the reaction mixture from yellow to bluish green was observed. The reaction was monitored by TLC after every 5 mins. After 3 successive irradiations (total irradiation time 15 min.) the reaction was found to complete. Then the reaction mixture was filtered through a Hirsch funnel and the residue was washed with dichloromethane. The filtrate was evaporated under reduced pressure. The resulting residue was subjected to Combiflash (Sg 100C ISCO Combiflash) chromatography and eluted with increasing polarities of n-hexane and ethyl acetate. The desired compound was obtained with hexane: ethyl acetate (90:10) polarity as colourless viscous oil [1.4 gm, 70%; $R_f$: 0.44 (Hexane:Ethyl acetate—80:20)] with 97.2% HPLC purity. The EI Mass spectra of the compound gave molecular ion at m/z 418 ($M^+$). The structure was established by comprehensive investigation of NMR spectral data recorded in $CDCl_3$. The $^1H$ NMR spectra of the compound showed the presence of six methoxyls at δ 3.87-3.38, four aromatic protons at δ 6.55-6.38, two methyls at δ 1.17 and 0.85 including pairs of methylene and methine protons. While the $^{13}C$ NMR spectra supporting the presence of these functionalities revealed that the compound is a biphenyl propane dimer. The DEPT spectrum reveals that the peaks at δ 11.7 & 21.98 correspond to C-5 & C-6 methyls, δ 26.68 correspond to C-1 & C-4 methylenes while peaks at δ 47.73 & 49.89 correspond to C-2 & C-3 methine carbons. Its structure was further confirmed by 2D NMR experiments (NOESY & HMBC) as 3(R)-ethyl-2(S)-methyl-3-(2",4",5"-trimethoxyphenyl)-1-(2',4',5'-trimethoxyphenyl)propane.

The following examples are given by way of illustration of the working of the invention in actual practice and therefore should not be constructed to limit the scope of the present invention.

EXAMPLE-1

Isolation of β-Isomer Rich Asarone

Repetitive silica gel column chromatography of the n-hexane extract (130 gm) of *A. calamus* rhizomes with n-hexane and n-hexane-ethyl acetate solvent mixtures afforded the asarone (35 gm, 2%); $R_f$: 0.48 (Hex:Ethyl acetate—96:4); $^1$H NMR (CDCl$_3$, 300 MHz): δ 6.84 (1H, s, H-6), 6.53 (1H, s, H-3), 6.50 (1H, dd, J=13.28 Hz, H-1'), 5.78 (1H, dq, J=7.05 Hz & 18.55 Hz, H-2'), 3.90, 3.89 and 3.81 (3H, s, 3×OCH$_3$) and 1.85 (3H, dd, J=8.8 Hz & 1.8 Hz, H-3'); $^{13}$C NMR (CDCl$_3$, 75 MHz): 151.38 (C-2), 148.41 (C-4), 142.23 (C-5), 125.66 (C-1'), 124.67 (C-2'), 117.88 (C-1), 113.96 (C-6), 97.36 (C-3), 56.46 (—OCH$_3$), 56.30 (—OCH$_3$), 55.92 (—OCH$_3$), 14.55 (C-3'); EIMS (m/z, %): 208 (M$^+$), 193 (M$^+$-CH$_3$), 165 (M$^+$-C$_3$H$_5$-2H).

On the basis of above spectral data and comparision with reported literature values (M. C. Gonzalez, M. A. Sentandrew, K. S. Rao, M. C. Zafra and D. Cortes, Phytochem., 1996, 43, 1361) it was identified as asarone. The GC-MS analysis of the compound using the following conditions reveled that it is a mixture of α- and β-asarones and are present in the ratio 80.39% and 13.21% respectively.

GC-MS Conditions:

Column: HP 5 MS, 30 m length×0.25 mm internal dia× 0.25 □m film thickness.

Carrier gas: Helium at the rate of 1.0 ml/min.; Oven temperature programme: Initial 50° C. hold for 2 min. ramp at the rate of 10° C./min to final temperature 280° C. hold for 5 min.; Inlet temperature: 250° C.; Interface temperature: 280° C.; MS ionization: Electron impact Source: 70 eV; Quadrapole temperature: 150° C.

EXAMPLE-2

β-isomer rich asarone (50 mg) was dissolved in ethyl alcohol (5 ml) and was irradiated in a microwave oven for 10 minutes with and without acidic montmorillonite clay (10 mg). The reaction was monitored by TLC after 2, 5 and 10 minutes, but found no product formation.

EXAMPLE-3

β-isomer rich asarone (50 mg) was dissolved in isopropanol (5 ml) and was irradiated in a microwave oven for 10 minutes with and without acidic montmorillonite clay (10 mg). The reaction was monitored by TLC after 2, 5 and 10 minutes, but found inert and no product was formed.

EXAMPLE-4

The above reaction was also carried out with two different alcoholic solvents such as ethanol and isopropanol under Sonochemical conditions. But the reaction found totally inert with no product formation.

EXAMPLE-5

To the β-isomer rich asarone (50 mg) xylene (5 ml) and acidic montmorillonite clay (10 mg) was added. The reaction mixture was stirred at room temperature for overnight. The TLC showed no change in the reaction mixture.

EXAMPLE-6

Synthesis of 3(R)-ethyl-2(S)-methyl-3-(2",4",5"-trimethoxyphenyl)-1-(2',4',5'-trimethoxyphenyl)propane β-isomer rich asarone (2.0 gm) in xylene (20 ml) and acidic montmorillonite clay (0.2 gm) was irradiated in a microwave oven for 15 minutes. The catalyst was removed by filtration and evaporated under reduced pressure. The residue was subjected to Combiflash chromatography (Sg 100C ISCO Combiflash) and eluted with n-hexane and ethyl acetate mixtures. The desired compound was obtained with hexane:ethyl acetate (90:10) polarity as colourless viscous oil (1.4 gm, 70%) with 97.2% HPLC purity; $R_f$: 0.44 (Hexane:Ethyl acetate—80:20); $^1$H NMR (CDCl$_3$, 300 MHz): δ 6.55 (2H, s, H-3' & 3"), 6.42 (1H, s, H-6'), 6.38 (1H, s, H-6"), 3.87, 3.85, 3.84, 3.82, 3.64 & 3.38 (18H, s, 6×-OCH$_3$), 2.68 (2H, td, H-1), 2.08 (1H, m, H-3), 1.9-1.85 (1H, m, H-2), 1.5 1.4 (2H, m, H-4), 1.17 (3H, d, H-6), 0.85 (3H, t, H-5); $^{13}$C NMR (CDCl$_3$, 75 MHz): 152.20 (C-2'), 152.05 (C-2"), 151.29 (C-4'), 147.59 (C-4"), 142.76 (C-5'), 139.24 (C-5"), 127.68 (C-1'), 127.12 (C-1"), 113.20 (C-6' & 6"), 98.10 (C-3'), 97.16 (C-3"), 59.90 (C-5", —OCH$_3$), 56.78 (C-5', —OCH$_3$), 56.59 (C-4", —OCH$_3$), 56.10 (C-4', —OCH$_3$), 55.49 (C-2", —OCH$_3$), 52.43 (C-2', —OCH$_3$), 49.89 (C-2), 47.73 (C-3), 26.68 (C-4), 21.98 (C-1), 11.76 (C-5 & C-6); EIMS (m/z, %): 418 (M$^+$, 100), 249 (44), 219 (26), 209 (12), 181 (18), 151 (6).

The Main Advantages of the Present Invention Are:

1. The process synthesises 3(R)-ethyl-2(S)-methyl-3-(2",4",5"-trimethoxy)phenyl-1-(2',4',5'-trimethoxy)phenyl propane, a novel neolignan.
2. The process effectively utilizes the toxic β-asarone rich Indian *A. calamus* oil, thereby tremendously enhancing its commercial utilization.
3. The novel single pot process discloses the high regioselectivity in forming the α-β' cross coupled neolignan framework.
4. The process provides the efficient usage of non-corrosive, non-toxic and eco-friendly acidic montmorillonite clay as catalyst for the neolignan synthesis for the first time.
5. The process provides a rapid and effective utilization of MORE chemistry for the synthesis of novel neolignan framework.
6. The process is simple, which involves extremely shorter reaction time.
7. The novel process provides extremely simple work up procedure and faster combiflash chromatographic purification of the product.
8. The novel process provides the neolignan in excellent yield (70%).
9. The process provides the neolignan as a clean colourless, viscous oil.
10. The process provides the neolignan with absolute homogeinity in thin layer chromatography.
11. The novel process provides the neolignan with very high purity (97.2%) as estimated by HPLC.
12. The process provides the neolignan in abundant quantity and thus provides the opportunity for the evaluation of its wide range of biological activities known for structurally similar neolignans.
13. The process provides a novel, simple, rapid and eco-friendly methodology for the large scale preparation of wide range of neolignan analogues under completely Green Chemistry conditions.

The invention claimed is:

1. A single pot process for the regioselective synthesis of the neolignan 3(R)-ethyl-2(S)-methyl-3-(2",4",5"-trimethoxyphenyl)-1-(2',4',5'-trimethoxyphenyl)propane from asarones which comprises mixing β asarone with montmorillonite clay catalyst in a ratio of 1.0:0.1 to 1.0:0.5 (w/w) in a hydrocarbon solvent and subjecting said solution mixture to microwave irradiation for a period of 5-20 minutes, removing the catalyst by filtration and evaporating the solvent from the filtrate under reduced pressure to obtain the residue, subjecting said residue to combiflash chromatography and eluting it with a mixture of n-hexane and ethyl acetate to obtain the neolignan product.

2. A process according to claim 1, wherein the ratio of β asarone to montmorillonite clay used is in the range of 1.0:0.1 to 1.0:0.2 (w/w).

3. A process according to claim 1, wherein the hydrocarbon solvent used is xylene.

4. A process according to claim 1, wherein the reaction time used for microwave irradiation is in the range of 5-15 minutes.

5. A process according to claim 1, wherein the neolignan product obtained is in the form of a colorless viscous oil.

6. A process according to claim 1, wherein the yield of neolignan product is in the range of 70-75%.

7. A process according to claim 1, wherein the purity of neolignan product is in the range of 97-98%.

* * * * *